(12) United States Patent
Haase et al.

(10) Patent No.: US 12,136,209 B2
(45) Date of Patent: Nov. 5, 2024

(54) ORIENTATION DETECTION FOR 2D VESSEL SEGMENTATION FOR ANGIO-FFR

(71) Applicant: KONINKLIJKE PHILIPS N.V., Eindhoven (NL)

(72) Inventors: Christian Haase, Hamburg (DE); Michael Grass, Buchholz in der Nordheide (DE); Martijn Anne Van Lavieren, Utrecht (NL); Cornelis Willem Johannes Immanuel Spoel, Helmond (NL); Romane Isabelle Marie-Bernard Gauriau, Paris (FR); Holger Schmitt, Luetjensee (DE); Javier Olivan Bescos, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 525 days.

(21) Appl. No.: 17/288,357

(22) PCT Filed: Oct. 25, 2019

(86) PCT No.: PCT/EP2019/079118
§ 371 (c)(1),
(2) Date: Apr. 23, 2021

(87) PCT Pub. No.: WO2020/084101
PCT Pub. Date: Apr. 30, 2020

(65) Prior Publication Data
US 2021/0383539 A1 Dec. 9, 2021

(30) Foreign Application Priority Data
Oct. 26, 2018 (EP) ..................... 18290125

(51) Int. Cl.
*G06K 9/00* (2022.01)
*G06T 7/00* (2017.01)

(52) U.S. Cl.
CPC .. *G06T 7/0012* (2013.01); *G06T 2207/10116* (2013.01); *G06T 2207/20101* (2013.01); *G06T 2207/30101* (2013.01)

(58) Field of Classification Search
CPC ............................................. G06T 2207/30101
See application file for complete search history.

(56) References Cited

U.S. PATENT DOCUMENTS

| | | |
|---|---|---|
| 11,004,198 B2 | 5/2021 | Isgum et al. |
| 2008/0221441 A1* | 9/2008 | Bjornerud ............. G06T 7/0012 600/425 |

(Continued)

OTHER PUBLICATIONS

International Search Report and Written Opinion of PCT/EP2019/079118, dated Nov. 27, 2019.

(Continued)

*Primary Examiner* — Hadi Akhavannik (57) ABSTRACT

An apparatus for assessing a vessel of interest and a corresponding method are provided in which the modeling of the hemodynamic parameters using a fluid dynamics model can be verified by deriving feature values from the segmented vessel of interest and inputting these feature values into a classifier. The classifier may then determine, based on the feature values whether the segmentation has been performed from proximal to distal, from distal to proximal or cannot be determined from the provided data. An incorrect segmentation order can thus be identified and potentially be corrected, thereby avoiding inaccurate simulation results.

20 Claims, 4 Drawing Sheets

(56) References Cited

U.S. PATENT DOCUMENTS

| | | |
|---|---|---|
| 2010/0161023 A1 | 6/2010 | Cohen |
| 2011/0135175 A1* | 6/2011 | Ostrovsky-Berman ............... G16H 30/40 382/128 |
| 2011/0170759 A1* | 7/2011 | Bjornerud ............ G06T 7/0012 382/131 |
| 2012/0011457 A1 | 1/2012 | Habets |
| 2012/0014574 A1* | 1/2012 | Ferschel ............ G06T 7/0012 382/128 |
| 2012/0203530 A1* | 8/2012 | Sharma ............ G16H 50/50 703/9 |
| 2014/0031690 A1* | 1/2014 | Toji ............ A61B 8/085 600/443 |
| 2014/0094692 A1* | 4/2014 | Tolkowsky ............ A61B 5/061 600/424 |
| 2016/0260213 A1 | 9/2016 | Reda |
| 2017/0109880 A1* | 4/2017 | Al-Kofahi ............ G06T 11/008 |
| 2017/0258433 A1* | 9/2017 | Gulsun ............ A61B 6/5217 |
| 2017/0262981 A1* | 9/2017 | Gulsun ............ G06F 18/24323 |
| 2018/0071027 A1 | 3/2018 | Taylor |
| 2018/0085170 A1 | 3/2018 | Gopinath |
| 2019/0019347 A1 | 1/2019 | Auvray et al. |
| 2021/0241453 A1* | 8/2021 | Naber ............ G06T 7/0012 |

OTHER PUBLICATIONS

Abbasi, Uzma Gulzar et al "Classification of Blood Vessels as Arteries and Veins for Diagnosis of Hypertensive Retinopahty", 2014 IEEE.

* cited by examiner

ORIENTATION DETECTION FOR 2D VESSEL SEGMENTATION FOR ANGIO-FFR

CROSS-REFERENCE TO PRIOR APPLICATIONS

This application is the U.S. National Phase application under 35 U.S.C. § 371 of International Application No. PCT/EP2019/079118, filed on Oct. 25, 2019, which claims the benefit of European Patent Application No. 18290125.6, filed on Oct. 26, 2018. These applications are hereby incorporated by reference herein.

FIELD OF THE INVENTION

The present invention relates to an apparatus for assessing a vessel of interest, a corresponding method and a computer program. In particular, the present invention relates to an apparatus which employs a trained classifier to automatically detect and/or correct the vessel segmentation orientation of the vessel segmentation used to generate a physiological model including a fluid dynamics model.

BACKGROUND OF THE INVENTION

An accurate assessment of a coronary disease is of great importance for determining optimized treatment options. Such an assessment requires knowledge about the hemodynamics in the coronary physiology. For that purpose, measures such as the Fractional Flow Reserve (FFR) or Instantaneous Wave-Free Ratio (iFR) may be used to correctly evaluate coronary disease in patients. Both, FFR as well as iFR, are a measure for the pressure drop of the blood along a vessel of interest, e.g. due to a stenosis in said vessel of interest. They may be determined as the ratio of the pressure distal the stenosis (Pa) to the pressure in the aorta (Pa).

Hereby, FFR measurements have to be performed during maximal blood flow, i.e. under hyperemia, which may cause discomfort in the patient. In contrast, iFR measurements are performed at rest during a specific period in diastole, thereby avoiding the necessity to induce hyperemia in the patient.

In the past, FFR and/or iFR measurements were typically performed invasively, by measuring the pressure at a position distal from and a position proximate to the lesion. In recent years, efforts have been taken to determine the FFR and/or iFR values non-invasively by means of the so-called "virtual" approach. In accordance with the virtual approach, the fluid dynamics in the coronary arteries of a patient are simulated on the basis of a physiological model including a fluid dynamics model representing the blood flow through the vessel or vessels of interest.

The physiological model is hereby generated on the basis of diagnostic image data of the coronary vasculature. That is, the vessel of interest as represented by the image data is segmented and, based on the segmentation, the physiological model is generated. In order to perform vessel segmentation, the user typically manually indicates a starting position and an ending position of the vessel of interest to be segmented. Hereby, the starting position is considered to correspond to the proximal end and the ending position is considered to correspond to the distal end of the vessel segment to be regarded. The starting and the ending position define a segmentation order of the vessel segmentation from proximal to distal.

A correct selection of the starting position and the ending position of the vessel to be segmented is thus important for achieving accurate fluid dynamics estimations using the fluid dynamics model since this selection determines an orientation of the vessel segment, in other words the "vessel segmentation orientation".

Normally, the vessel segmentation orientation is such that it is assumed that blood flows from the starting position to the ending position. Accordingly, fluid dynamics modelling is performed such that the starting position of the vessel segmentation corresponds to a proximal position and the ending point corresponds to a distal position.

On the other hand, if the starting and the ending position are interchanged, for example during manual selection, the vessel segmentation orientation will be inverted, corresponding to an incorrect blood flow direction from a distal position to a proximal position. In this case, fluid dynamics modelling will provide inaccurate or incorrect results. Accordingly, the process is rather error-prone.

SUMMARY OF THE INVENTION

It is therefore an object of the present invention to prevent an incorrect fluid dynamics assessment in a vessel of interest using a physiological model including a fluid dynamics model of said vessel of interest.

More specifically, it is an object of the invention to provide an apparatus and a method for automatically detecting the vessel segmentation orientation of a vessel of interest to be segmented for generating a physiological model including a fluid dynamics model and for verifying the vessel segmentation orientation, such that the user may be made aware of an incorrectly assessed vessel of interest.

This objective is achieved by an apparatus for assessing a vessel of interest of a patient, the apparatus comprising: an input unit configured to receive segmentation data including an indication of at least one vessel segment, resulting from a segmentation of the vessel of interest, a computation unit configured to derive at least one vessel parameter for the at least one vessel segment, and a classifying unit configured to receive the at least one vessel parameter and to classify said at least one vessel parameter to obtain an indication of a segmentation orientation of said at least one vessel segment, wherein the classifying unit has been trained using a training dataset in the form of a dataset correlating a set of known vessel segmentation orientations with corresponding values of the at least one vessel parameter.

In that context, the term segmentation data may particularly refer to a dataset including one or more segments of the vessel of interest, i.e. the vessel which shall be regarded to e.g. determine the hemodynamic properties of said vessel of interest. The segments may hereby be obtained by acquiring at least one diagnostic image using a medical imaging modality and by identifying the vessel of interest in said at least one diagnostic image. The identified vessel of interest is then segmented into said one or more segments. The segment size may hereby be predetermined, either manually by a user or automatically by the apparatus.

The term vessel parameter may particularly refer to a parameter that may assist in deriving further information about the vessel and/or the segmentation. As an example, upon segmenting, a feature value, such as a geometric parameter value is derived for at least a part of the vessel segments, e.g. respective cross section values may be determined for each vessel segment. These cross section values may then be regarded as a function of the vessel length in order to determine a course indicating the vessel cross section development from the starting position to the ending position of the vessel segmentation.

The thus determined vessel parameter may then be input into the classifying unit. The classifying unit is provided such that it has been trained with a ground truth using a training dataset. The training dataset may particularly have trained the classifying unit with a ground truth that allows the classifying unit to classify the input vessel parameter or vessel parameters such as to detect deviations of the vessel segmentation orientation. That is, in the above-mentioned example, the classifying unit has been trained with a ground truth that allows the classifying unit to determine, from the course of the cross section values as a function of the vessel length, the segmentation orientation of the vessel segmentation. The classifying unit may thus determine that the orientation is as assumed, i.e. that a proximal position of the vessel of interest has served as the starting position for the vessel segmentation and a distal position of the vessel of interest has served as the ending position for the vessel segmentation. The classifying unit may also determine that the orientation deviates from the assumption. In some embodiments, this means that the classifying unit may determine a distal position of the vessel of interest has served as the starting position for the vessel segmentation and a proximal position of the vessel of interest has served as the ending position. In some embodiments, a deviation from the initial assumption may also correspond to the classifying unit determining that it cannot be detected which position of the vessel of interest corresponds to the starting and the ending position of the segmentation, respectively and that, thus, the orientation is unclear.

Accordingly, based on the classification, the classifying unit may obtain an indication of the vessel segmentation orientation. This indication may then be output to the user and/or may be used by the apparatus to automatically correct the segmentation order.

In some embodiments, the apparatus further comprises a segmentation unit configured to receive a user input indicating a segmentation starting position and a segmentation ending position for the vessel of interest represented in at least one diagnostic image, and to segment the vessel of interest represented in the at least one diagnostic image to obtain the segmentation data, the segmentation data comprising a plurality of segments, each obtained for a particular position of a plurality of positions along a length of the vessel of interest, wherein the first position corresponds to the segmentation starting position and the last position corresponds to the segmentation ending position. In some embodiments the at least one diagnostic image has been acquired using X-ray angiography.

The apparatus may further include a segmentation unit which is configured for segmenting at least one diagnostic image to generate the segmentation data and for providing the segmentation data to the input unit. In that context, it shall be understood that the segmentation may be based on one or more diagnostic images representing at least the vessel of interest.

The one or more diagnostic images may have been acquired using a medical imaging modality. Any imaging modality may be used as long as it allows to identify the vessel of interest and to perform vessel segmentation. As an example for suitable medical imaging modalities computed tomography, magnetic resonance imaging, ultrasound imaging or the like are mentioned.

In some embodiments, the at least one diagnostic image may particularly comprise a two-dimensional X-ray angiography image. For this purpose, a contrast agent may be introduced into the vessel of interest. Subsequently, X-ray angiography of the contrast-agent filled vessel is performed. Hereby, the acquired image may particularly have a low degree of foreshortening and low overlap. Further, the contrast agent filling should be sufficient to provide suitable contrast. Upon acquisition, the X-ray angiography image may then be presented to a user for manual segmentation input.

In some embodiments, the user may particularly be requested to manually input a starting position and an ending position for the segmentation. That is, typically, the at least one diagnostic image is presented to a user who may regard the vessel and provide an input indicating the points that the user considers to correspond to the starting and ending position.

In some embodiments, the apparatus automatically assigns a starting position and an ending position for the segmentation. This automatic assignment may also be based on a classification. More specifically, the automatic assignment may be performed by training a (separate) classifier in the apparatus which a training dataset of diagnostic images that allow the classifier to determine a potential starting and ending position for the data.

Upon selection of the starting and ending position, the segmentation is started. Hereby, the segmentation proceeds along the length of the vessel of interest from the starting position to the ending position. That is, a segmentation of the vessel of interest is performed at a plurality of positions along the length of the vessel of interest. Hereby, the starting position corresponds to a first position of the plurality of positions and the ending position corresponds to a last position of the plurality of positions. Further, a respective segment is obtained at each position of the plurality of positions.

The thus obtained plurality of segments—one for each of the positions—are comprised in the segmentation data. In that context, it shall be understood that the term position shall be interpreted broadly, as referring to a segment of finite length that has been obtained at a particular point along the length of the vessel of interest, i.e. along a longitudinal direction inside the vessel of interest.

Subsequently, at least one vessel parameter is calculated based on the plurality of segments. That is, for each segment from the plurality of segments, a feature value, such as a geometric parameter value may be obtained. This feature value may then be regarded as a function of the plurality of positions along the length of the vessel of interest for further analysis. In some embodiments, the regarding of the feature values as a function of the plurality of positions may be performed by the computation unit and the resulting vessel parameter (such as a slope of the function) may be input into the classifying unit for classification. In some embodiments, the feature values themselves, along with their respective positions and/or an index of their respective segments for which they have been derived, may be inserted into the classifying unit which then itself determines the vessel parameter and classifies the vessel parameter to obtain the indication.

According to some embodiments, the at least one vessel parameter is based on one or more of: a geometric parameter value for each segment of the plurality of segments, and/or a first value related to the first position and the second position, respectively, and/or a second value related to the first position and the second position, respectively, and/or an acquisition parameter value related to the acquisition settings used for acquiring the at least one diagnostic image, and/or a dynamics parameter derived from the at least one diagnostic image.

In some embodiments, the at least one vessel parameter may be derived by analyzing a plurality of feature values obtained for the plurality of segments. One such feature value may particularly relate to a geometric parameter value derived for each of the segments, such as a cross section value or a diameter that is determined for each of the segments. The geometric parameter value may then be regarded as a function of the plurality of positions along the vessel of interest or as a function of an index indicating the respective segment for which the geometric parameter value has been determined. Subsequently, the slope of the function may be derived. In some embodiments, the slope may particularly be determined by a linear regression through all geometric parameter values. The vessel parameter to be input into the classifying unit then comprises the slope determined as described above.

Alternatively or additionally, the at least one vessel parameter may be derived by overlaying the at least one (two-dimensional) diagnostic image with a two-dimensional coordinate system and considering the x,y-coordinates for the starting and ending point of the vessel segment (indicated by the starting and ending position). That is, a second value $x_1$ may be determined for the starting point at the starting position and a second value $x_2$ may be determined for the ending point at the ending position as respective feature values. The vessel parameter to be input into the classifying unit then comprises an x-difference value $x_{12}$ indicating the difference (in x-direction) between the two second values $x_1$, $x_2$.

Alternatively or additionally, a first value $y_1$ may be determined for the starting point at the starting position and a first value $y_2$ may be determined for the ending point at the ending position as respective feature values. The vessel parameter to be input into the classifying unit then comprises a y-difference value $y_{12}$ indicating the difference (in y-direction) between the two first values $y_1$, $y_2$.

Alternatively or additionally, information that is unrelated to the segmentation and the diagnostic images may be used for the at least one vessel parameter. In some embodiments, one or more acquisition parameters indicative of the acquisition settings may be provided to the classifier, such as C-arm angulations, the patient orientation information and/or the positioning of the table the patient is situated upon. In some embodiments, a tracked position of an intravascular measurement device, such as a guide catheter as visible in an X-ray image may also be used.

Alternatively or additionally, a dynamics parameter, that is a parameter that is indicative of the flow dynamics through the vessel of interest, may be derived from the at least one diagnostic image. More particularly, one or more diagnostic images may be used to retrieve further information about the dynamics of the fluid flow—in particular the contrast agent flow—over time. In some embodiments, a time series of diagnostic images may be used to track the flow of the contrast agent. This allows to determine the flow direction through the vessel of interest directly.

The slope value and/or the x-difference value and/or the y-difference value and/or the one or more acquisition parameter values and/or the dynamics parameter may then be provided, separately or in combination, to the classifying unit. The classifying unit may be trained with a ground truth for correlating one or more of the vessel parameters such as the slope value, the x-difference value, the y-difference value, the one or more acquisition parameter values and/or the dynamics parameter, to the vessel segmentation orientation.

To that end, the training dataset may particularly be provided in the form of a dataset of vessel segmentation data with known orientation including the above-cited parameters. In other words, the training dataset correlates a set of known vessel segmentation orientations with corresponding values of the at least one vessel parameter.

The classifying unit may then use the trained ground truth to detect whether the vessel segmentation orientation is "normal" i.e. proximal to distal, "inverted" i.e. distal to proximal, or unclear. Based on this detection, the classifying unit may provide an indication of the classification result.

According to some embodiments, the classifying unit may implement multiple sub-units. Hereby, the sub-units may particularly be trained using different training datasets. For example, each sub-unit may be trained with a different training dataset, wherein the vessel segmentation orientation is correlated with a corresponding subset of the vessel parameters.

As an example, one sub-unit in the classifying unit has received a training dataset of vessel segmentation data having known orientation including the vessel parameters slope value, x-difference value, y-difference value, C-arm angle indication as an acquisition parameter and contrast flow information as a dynamics parameter. One further sub-unit has received a training dataset of vessel segmentation data having known orientation including the slope value, the x-difference value, the y-difference value and a contrast flow information as a dynamics parameter. In this case, the first sub-unit may be used in case the above-parameters are all available as input and the second sub-unit may be used in case the C-arm angle indication is missing.

In some embodiments, some of the classifying sub-units may have been trained to use a single vessel parameter for segmentation orientation determination. In some embodiments, the classifying sub-units may have been trained to use two, three, four and so forth vessel parameters in different combinations.

This arrangement allows the apparatus to adapt to different situations in which different inputs, in particular different subsets of vessel parameters, can or will be provided to determine the vessel segmentation orientation.

In some embodiments, the classifying unit comprises a support vector machine.

The term support vector machine may be understood in the conventional manner, that is as referring to a binary linear classifier implementing a supervised, semi-supervised or unsupervised learning model. The classifier is trained using a training dataset comprising data marked as belonging to one of two categories. The training output is a model that represents the values of the training dataset as points in space mapped such that the input is divided into either one of the two categories with a clear gap in between that is as wide as possible.

Each new input to be classified is then mapped into that same space a predicted to belong to one of the two category depending on the side of the gap on which they are provided. In the present context, these two categories comprise the orientation being proximal to distal (i.e. "correct") and the orientation being distal to proximal ("incorrect"). Further, any result that is provided inside the gap cannot be clearly classified and, as such, is considered "unclear" in the present context.

In that respect, it shall be understood that, in some embodiments, the classifying unit and/or the computation unit may be implemented using a neural network that has been trained with a respective training dataset as described above. The neural network may receive the segmentation data and may determine, based on the training, the orientation of the segmentation.

According to some embodiments, the apparatus further comprises a display unit, wherein the display unit is configured to generate a graphical representation in response to the indication of the segmentation orientation and to display said graphical representation to a user.

In some embodiments, the apparatus may particularly be provided with a display unit that is configured to generate a graphical representation in response to the indication of the segmentation orientation. The graphical representation may then be displayed to a user. The graphical representation may include a representation of the vessel of interest and respective markers indicating the starting and the ending position of the vessel segmentation. The graphical representation may particularly comprise a graphical representation of the indication. In some embodiments, the graphical representation may comprise a warning message that the orientation is in the wrong order (i.e. from distal to proximal) or that the orientation cannot be determined, i.e. is unclear. In some embodiments, the graphical representation may indicate that the orientation is in the right order.

According to an embodiment, the indication of a segmentation orientation comprises one of: an error indication indicating that the segmentation orientation is from distal to proximal, a verification indication indicating that the segmentation orientation is from proximal to distal, or a clearness indication indicating that the segmentation orientation is unclear.

The term indication may particularly refer to a visual, auditory and/or haptic indication of the vessel orientation that may be used to inform the user about the segmentation orientation.

An error indication may hereby particularly correspond to an indication that the segmentation has been performed in the wrong order, i.e. the vessel segmentation orientation is inverted, from distal to proximal, such that the resulting modeling of the fluid dynamics in the segmented vessel of interest may be inaccurate. The error indication may be visual and/or auditory and may particularly be in the form of a visual and/or auditory warning message. The error indication may also be configured to terminate the fluid modeling process, such that no incorrect results are achieved.

A verification indication may particularly correspond to an indication that the segmentation has been performed in the right order, i.e. that the vessel segmentation orientation is normal, from proximal to distal. Accordingly, the resulting modeling of fluid dynamics in the segmented vessel of interest may be assumed to be accurate. The verification indication may also be visual or auditory. In some embodiments, the verification indication may be such that no indication is output at all when the orientation is found to be in the correct order.

A clearness indication may correspond to an indication that the segmentation order cannot be determined, i.e. is unclear. That is, the resulting modeling of the fluid dynamics may be accurate (if the order of segmentation has been correct) or inaccurate (if the order has been incorrect), but it cannot be determined what is the case. The clearness indication may be visual and/or auditory and may particularly comprise a warning message. In some embodiments, the visual and/or auditory warning message may be different than the visual and/or auditory warning message used for the error indication. In some embodiments, the clearness indication may cause the fluid dynamics model to stop modeling the fluid dynamics through the vessel of interest.

In some embodiments, the apparatus comprises a correction unit configured perform a correction segmentation in response to the indication of the segmentation orientation of the vessel segmentation comprising the error indication.

According to some embodiments, the apparatus may further be configured to perform a segmentation correction in response to the error indication. That is, the apparatus determines that the segmentation has been performed in the wrong order and may, in response to this determination, switch the starting and ending position for the segmentation. The segmentation may then be re-done in the correct order and the subsequent modeling of the fluid dynamics may be performed on the basis of the new segmentation.

In some embodiments, the apparatus further comprises an output unit to output the indication of the segmentation orientation of the vessel segmentation.

According to some embodiments, the apparatus may further be provided with an output unit for providing a visual, auditory and/or haptic output to the user. In some embodiments, the output unit may particularly comprise a sound emitter to output an auditory signal warning the user that the orientation should not be used or verifying to the user that the orientation may be use. In some embodiments, the output unit may be part of or correspond to the display unit. In some embodiments, the output unit may be separate from the display unit and the display unit may only be used for interfacing with the user for defining the starting and ending position of the segmentation and representing the modeling results.

In some embodiments, the classifying unit is trained using a training dataset comprising a plurality of known segmentation orientations.

The classifying unit may be trained by inputting a training dataset. This training dataset may particularly comprise a plurality of vessel segmentations having known orientation. That is, the classifying unit receives information as to which vessel segmentation has which orientation. Based on this, the classifying unit may particularly be trained with respect to which vessel parameter value may be indicative of which vessel segmentation orientation. In the case of the classifying unit comprising a support vector machine, an unclear segmentation orientation may be defined by a distance measure in the feature space and a predetermined minimum threshold for this distance.

According to a further aspect, a method for assessing a vessel of interest of a patient is provided, the method comprising the steps of receiving segmentation data including an indication of at least one vessel segment, resulting from a vessel segmentation of the vessel of interest, deriving at least one vessel parameter for the at least one vessel segment, and classifying said at least one vessel parameter to obtain an indication of a vessel segmentation orientation of said at least one vessel segment, wherein the classifying is carried out on the basis of a ground truth derived from a training dataset correlating a set of known vessel segmentation orientations with corresponding values of the at least one vessel parameter.

In some embodiments, the method further comprises the steps of outputting the indication of the segmentation orientation of said vessel segmentation. In some embodiments, the method further comprises the step of correcting the segmentation orientation of the vessel segmentation if the segmentation orientation is from distal to proximal.

In a further aspect, a computer program for controlling an apparatus according to the invention is provided, which, when executed by a processing unit, is adapted to perform the method steps according to the invention. In an even further aspect, a computer-readable medium is provided having stored thereon the above-cited computer program.

It shall be understood that the apparatus of claim 1, the method of claim 12, the computer program of claim 14 and the computer-readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

The illustration in the drawings is schematically. In different drawings, similar or identical elements are provided with the same reference numerals.

Figure 1:
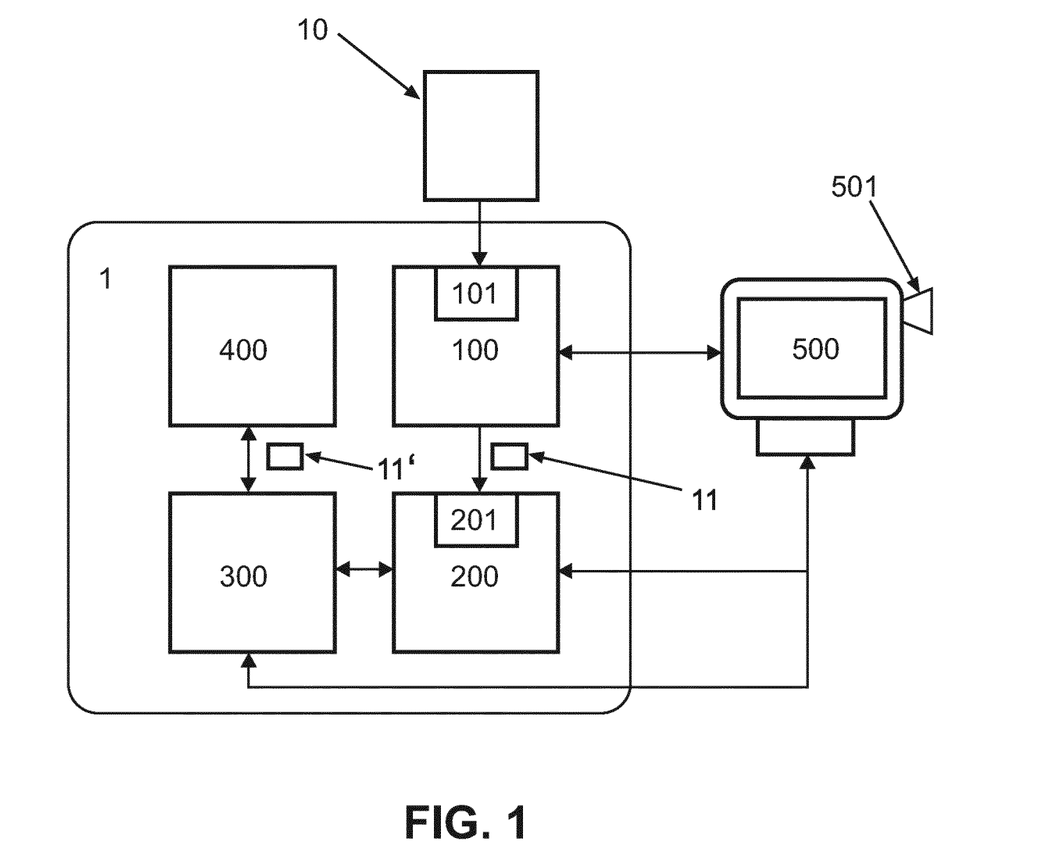
FIG. 1 schematically illustrates an apparatus for assessing a vessel of interest according to an embodiment.

FIG. 1 represents schematically an exemplary embodiment of an apparatus for assessing a vessel of interest of a patient. In the exemplary embodiment of FIG. 1, the apparatus 1 comprises an input unit 100 including a segmentation unit 101, a computation unit 200 including a modelling unit 201, a classifying unit 300, a correction unit 400 and a display unit 500 including an output unit 501.

In the exemplary embodiment according to FIG. 1, the apparatus 1 receives a diagnostic image 10 from an imaging modality via input unit 100. In this particular example, the diagnostic image 10 corresponds to a two-dimensional X-ray angiography image 10 of a vessel of interest which has been filled with contrast agent. The angiography image 10 may have a low degree of foreshortening, low overlap and good contrast agent filing. Input unit 100 provides the angiography image 10 to display unit 500. Display unit 500 generates a graphical representation of angiography image 10 and outputs said graphical representation to a user. Display unit 500 further generates a graphical representation of a request for prompting the user to provide input indicating the starting and the ending position in a vessel of interest for performing the segmentation. Upon receipt of said user input on the starting and the ending position, the segmentation unit 101 may then perform a segmentation of the angiography image 10.

The thus generated segmentation data 11 may then be provided to computation unit 200 and modeling unit 201.

Modeling unit 201 may use the segmentation data 11 to provide a physiological model of the vessel of interest, the physiological model including a fluid dynamics model representing the fluid dynamics through the vessel of interest. The thus generated model may be provided to display unit 500. Display unit 500 may generate a graphical representation of the model of the vessel of interest and display said representation to a user.

The fluid dynamics model used in the exemplary embodiment according to FIG. 1 may particularly correspond to a lumped parameter fluid dynamics model. In such a lumped parameter fluid dynamics model, the fluid dynamics of the vessels are approximated by a topology of discrete entities. As an example, a vasculature, such as a vessel tree, may be represented by a topology of resistor elements each having a particular resistance. Accordingly, the outlet at a distal end of the vessel is also represented by a particular resistor element. This resistor element is then connected to ground such as to represent the termination of the vessel. Similarly, respective resistor elements may be connected to the series of resistor elements representing the vessel of interest, such as to represent the outflow from the vessel of interest at certain bifurcations. These resistor elements may typically also be connected to ground.

Lumped parameter fluid dynamics models reduce the number of dimensions compared to other approaches such as Navier-Stokes or the like. Accordingly, using a lumped parameter fluid dynamics model may allow for a simplified calculation of the fluid dynamics inside the vessels and are thus particularly beneficial in terms of processing time.

The physiological model may further comprise a geometric model of the vessel of interest. In the particular embodiment according to FIG. 1, since the input has been a single two-dimensional X-ray angiography image 10, the geometric model may particularly correspond to a two-dimensional or quasi-three dimensional geometric model in which the third dimension is approximated.

Computation unit 200 may use the segmentation data 11 to calculate one or more values indicative of a vessel parameter. In the exemplary embodiment of FIG. 1, computation unit 200 may particularly determine, for each of the segments in the segmentation data 11, a diameter of the vessel of interest and may then regard the thus derived diameters as a function of the segment number. This allows to derive the linear slope for the vessel diameter along the length of the segmented vessel of interest. This slope may then be used as a first vessel parameter.

Further, computation unit 200 may regard the vessel in an x-y-coordinate system. Subsequently, computation unit may determine the x-y coordinates of the vessel segmentation starting position and the vessel segmentation ending position. The computation unit 200 may then be configured to determine a first value indicating a difference in the y-coordinates for the starting and the ending position, respectively. Further, the computation unit 200 may be configured to determine a second value indicating a difference in the x-coordinates for the starting and ending position, respectively.

In the exemplary embodiment according to FIG. 1, the x-y coordinates for the segmentation starting position may be (1,2) and the x-y coordinates for the segmentation ending position may be (3,5). The first value may thus correspond to a value of 3 and the second value may correspond to a value of 2. The first value may be considered as a second vessel parameter. The second value may be regarded as a third vessel parameter.

The three vessel parameters (i.e. the slope of the diameter and the difference values in x- and y-direction) may then be provided from computation unit 200 to classifying unit 300.

In the exemplary embodiment according to FIG. 1, classifying unit 300 comprises a linear support vector machine that has been trained on a dataset of vessel segmentation data having known orientation. Based on this training, the classifying unit 300 may be configured to classify the segmentation data based on the derived vessel parameters. The classifying may hereby particularly be performed into one of three classes. The first class may correspond to a vessel segmentation that has been performed in the correct order, i.e. from proximal to distal. The second class may correspond to a vessel segmentation that has been performed in an incorrect order, i.e. from distal to proximal. The third class may correspond to a vessel segmentation which order is unknown or unclear.

Figure 2:
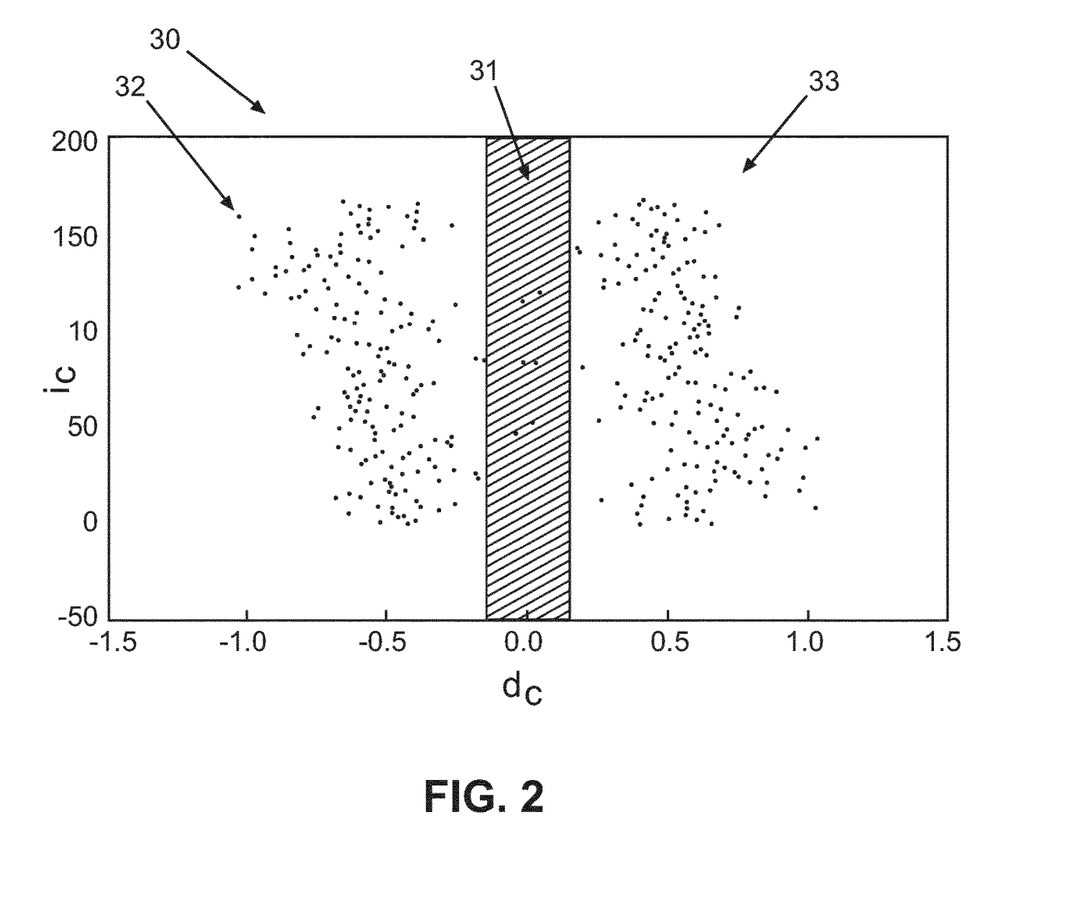
FIG. 2 illustrates an example classification result according to an embodiment.

To that end, FIG. 2 corresponds to an exemplary output of classifying unit 300 in case classifying unit comprises a linear support vector machine. Graph 30 shows a plot of the distances $d_c$ in feature space for the segmentations indexed with $i_c$. Hereby, the results are separated by a separating plane indexed by $d_c=0.0$. The dots on the left-hand side 32 of graph 30 correspond to segmentations which have an orientation that goes from distal to proximal (i.e. which have been segmented in the wrong order). The dots on the right-hand side 33 of graph 30 corresponds to segmentations which have an orientation that goes from proximal to distal (i.e. which have been segmented in the correct order). The grey area 31 indicates a predefined range for cases for which the segmentation orientation is deemed unknown.

In other words: In the exemplary embodiment according to FIG. 2, the distance in feature space (ranging from −1.5 to +1.5) is a measure of the segmentation orientation with all cases having a distance in feature space between −1.5 to −0.1 corresponding to orientation distal to proximal, all cases having a distance in feature space between 0.1 to 1.5 corresponding to orientation proximal to distal and all cases between −0.1 to 0.1 corresponding to "unclear" orientation.

Going back to the embodiment of FIG. 1, the classification result is then evaluated by apparatus 1.

In the specific embodiment according to FIG. 1 this means that, in case classifying unit 300 determines that the orientation is from proximal to distal, the fluid dynamics model may be used to determine the fluid dynamics through the vessel of interest. In this case, the classifying unit 300 may provide a command to modeling unit 201 to perform fluid dynamics modeling and to output the result to display unit 500. Further, classifying unit 300 may provide a verification indication to display unit 500, prompting display unit 500 to generate a graphical representation thereof to confirm to the user that the segmentation has been performed in the correct order. Display unit 500 may further render a graphical representation of the hemodynamic parameters simulated using the fluid dynamics model.

In some embodiments, the fluid dynamics model may already have been used to determine the hemodynamics prior to the classification result being available. In these cases, classifying unit may prompt the modeling unit 501 to transfer the results to display unit 500 for graphical representation. In some embodiments, the modeling unit 501 may also transfer the results prior to receiving a command from the classifying unit and classifying unit may only provide the verification indication to display unit 500 to ensure that the results are verified to the user.

Figure 3:
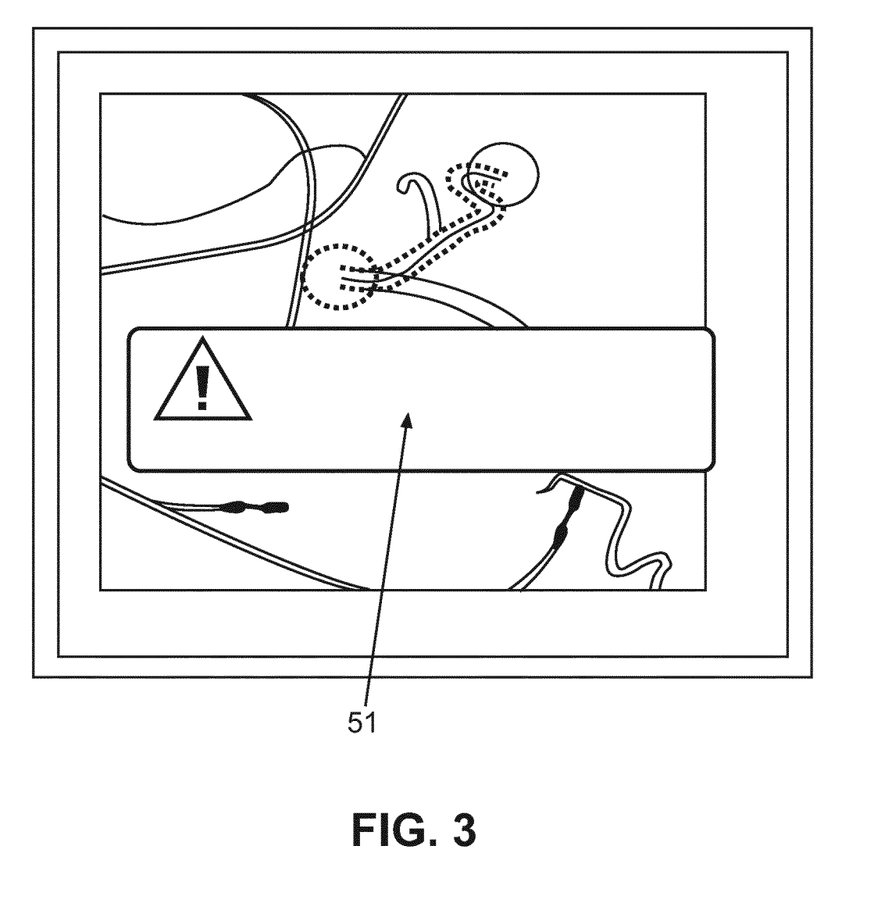
FIG. 3 illustrates an exemplary graphical representation to be presented on a display unit.

In case classifying unit 300 determines that the orientation is from distal to proximal, an error indication may be generated by classifying unit 300 and provided to display unit and/or output unit for outputting a warning to the user. This warning may correspond to a graphical representation of a warning message 51 as e.g. shown in FIG. 3. Alternatively or additionally, the warning may correspond to an auditory or haptic indication to the user.

In this case, classifying unit 300 may further be configured to instruct modeling unit 201 to not generate and/or output a model of the vessel of interest. Alternatively or additionally, modeling unit 201 may already have generated the physiological model including the fluid dynamics model. In this case, the model may be transferred to display unit 500 as well and a graphical representation thereof may be generated by and shown on display unit 500, whereby the graphical representation may further include the warning message.

In the exemplary embodiment according to FIG. 1, classifying unit 300 may also be configured to transmit the diagnostic image 10 and/or the segmentation data 11 to correction unit 400. Correction unit 400 may then correct the segmentation of the diagnostic image 10 or correct the segmentation data 11 to generate segmentation data 11' representing the correct segmentation order.

It shall be understood that, although correction unit 400 is represented as a separate entity in FIG. 1, it may also be integrated into segmentation unit 101, whereby correction unit 300 may particularly correct the starting and ending position and prompt segmentation unit 101 to redo the segmentation with the corrected starting and ending position to retrieve segmentation data 11'.

Segmentation data 11' may then be provided to modeling unit 201. Modeling unit 201 may use the segmentation data 11' to generate the physiological model including the fluid dynamics model and to simulate corresponding hemodynamic parameters using the fluid dynamics model. Modeling unit 201 may further provide the simulation result and/or the physiological model to display unit 500 for graphical representation. The graphical representation may include an indication that the segmentation used for modeling has been automatically corrected.

The classifying unit 300 may determine that the orientation of the segmentation is unknown. Referring back to FIG. 2, this is the case for all dots within the area 31. Here, a minimal threshold for the distance in feature space (represented by the grey area 31) has been determined and each distance value within this threshold area corresponds to an unknown orientation.

To that end, it may be understood that modeling unit 201 may use the segmentation data 11 having unknown orientation to generate the physiological model including the fluid dynamics model and to simulate the hemodynamic parameters.

However, the classifying unit 300 may provide a clearness indication to display unit 500. Display unit 500 may then generate a graphical representation of the clearness indication, in particular in the form of a warning message to be shown on display unit 500. Further, the output unit 501 may generate an auditory warning message to indicate to the user that the orientation is unknown, such that the user may review the information and potentially correct the segmentation and/or not rely on potentially inaccurate simulation results.

Figure 4:
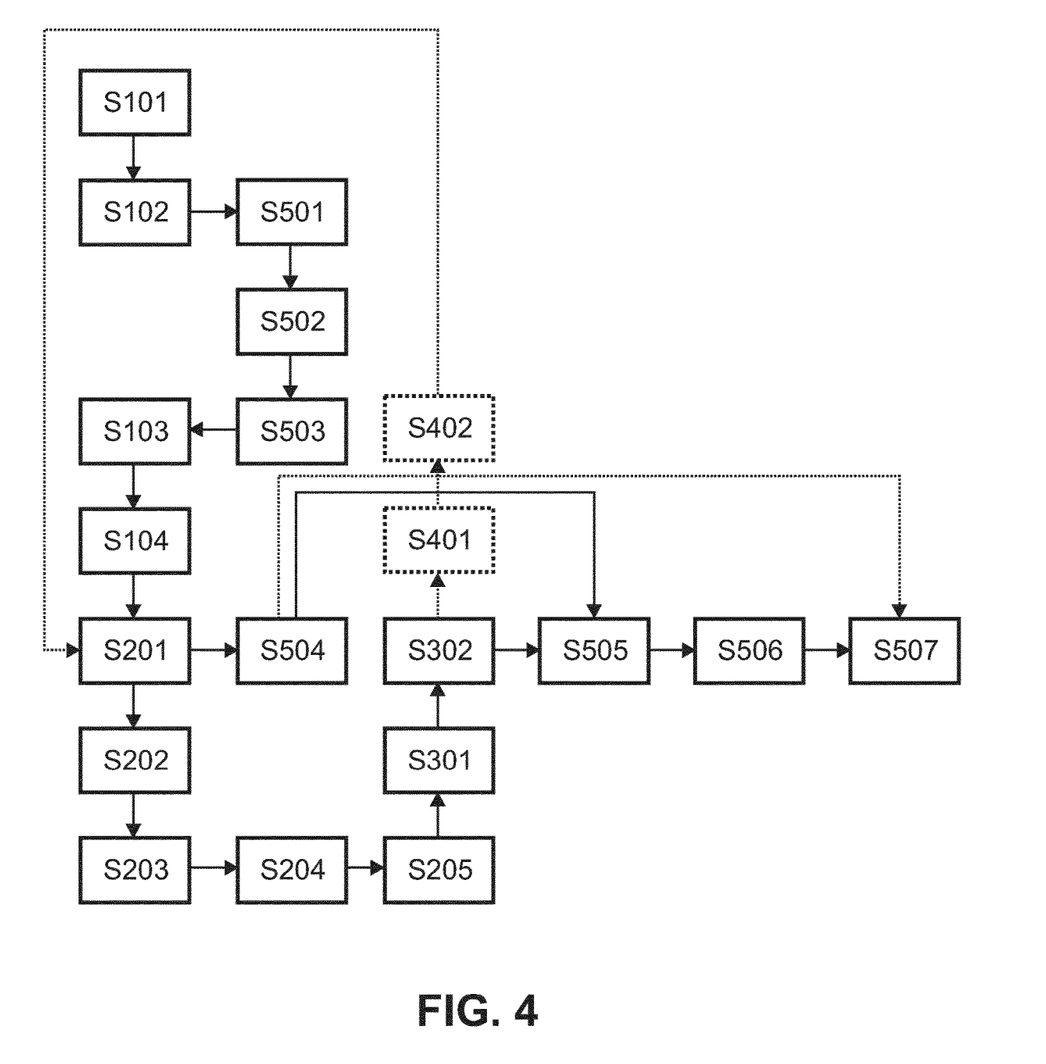
FIG. 4 represents a flow chart for a method for assessing a vessel of interest according to an embodiment.

FIG. 4 schematically illustrates a method for assessing a vessel of interest. In step S101, the input unit 100 receives a diagnostic image 10, which, in the embodiment according to FIG. 4 corresponds to a two-dimensional X-ray angiography image 10 of a vessel of interest. In step, S102, the input unit 100 provides the angiography image 10 to display unit 500.

In step S501, the display unit 500 generates a graphical representation of angiography image 10. Further, in step S502, the display unit 500 presents the graphical representation to a user and requests the user to indicate the starting and the ending position for performing the segmentation of the vessel of interest. In step S503, the user provides the respective input indicating the starting and ending position.

Then, the method proceeds to step S103, where the segmentation unit 101 performs a segmentation of the angiography image 10.

In step S104, the segmentation data 11 is provided from input unit 100 and segmentation unit 101 to computation unit 200 and modeling unit 201. In step 201, the modeling unit 201 uses the segmentation data 11 to generate a physiological model including a geometric model of the vessel of interest and a fluid dynamics model for simulating the fluid dynamics through the vessel of interest and provides, in step S202, the model to display unit 500. In step S504, the display unit 500 generates a graphical representation of the geometric model and the fluid dynamics model and displays said representation to a user.

Further, the computation unit 200 calculates one or more values indicative of a vessel parameter using the segmentation data 11. Specifically, in step S202, computation unit 200 determines, for each of the segments in the segmentation data 11, a diameter of the vessel of interest and determines a slope of the function representing the diameter in dependence of the segment number. Further, in step S203, the computation unit 200 regards the vessel of interest in a two-dimensional (x,y) coordinate system and determines a first value indicating a difference in the y-coordinates for the starting and the ending position of the segmentation of vessel of interest, respectively. Additionally, in step S204, the computation unit 200 determines a second value indicating a difference in the x-coordinates for the starting and ending position, respectively. The first and second value are then used as a second and third vessel parameter. In step, S205, the computation unit 200 provides the three vessel parameters to classifying unit 300.

In step S301, the classifying unit 300 classifies the segmentation data based on the derived vessel parameters into one of three classes, namely "proximal to distal" (segmentation in the correct order), "distal to proximal" (segmentation in the incorrect order) or "unclear" (segmentation orientation cannot be determined). In step S302, classifying unit 300 outputs the classification result as one of a verification indication, an error indication or a clearness indication to display unit 500. According to the exemplary method of FIG. 4, in case the classification result corresponds to an error indication, the error indication is further provided to correction unit 400 in step S302.

In step S505, the display unit 500 generates a graphical representation of the classification result. That is, in case the classification result includes the verification indication, the display unit 500 generates a graphical representation of the verification indication and displays it alongside the graphical representation of the physiological model. Hereby, the graphical representation may typically include a geometric model of the vessel of interest, one or more hemodynamic parameters determined using the fluid dynamics model and the verification indication indicating that the segmentation orientation has been verified, such as a text message on the display unit 500 indicating "Segmentation orientation from proximal to distal." or the like. In some embodiments, step S505 may also include outputting an auditory or haptic confirmation signal through output unit 501.

In case the classification result includes the error indication, display unit 500 in step S505 generates a graphical representation of the error indicating and displays it to a user. In some embodiment, the graphical representation may comprise a warning message. In some embodiments, the warning message may read "Segmentation orientation from distal to proximal." or the like. In some embodiments, the graphical representation may further include the diagnostic image 10 which is overlaid with the warning message. In some embodiments, the graphical representation may also include a request prompting a user to manually correct the starting and ending position, i.e. the segmentation orientation. Further, step S505 may also include outputting an auditory or haptic error signal through output unit 501.

In the exemplary embodiment according to FIG. 4, in step S505, a warning message is displayed on the display unit 500 in case of an error indication. Then, the warning message proceeds to a message "Correcting orientation" in step S506 indicating that correction unit 400 is performing a correction of the segmentation.

In step S401, in response to the error indication, correction unit 400 retrieves the diagnostic image 10 or the segmentation data 11 and performs a correction of the segmentation such that the segmentation is performed in the right order. In step S402, correction unit 400 outputs the corrected segmentation data 11' to modeling unit 201, which then proceeds to generate a physiological model including a fluid dynamics model based on the corrected segmentation data 11' in step S201 and provides the thus corrected model to display unit 500 in step S504. In step S507, the display unit then displays a graphical representation of the corrected model along with a message indicating that the segmentation orientation on which the model is based has been corrected, such as a message stating "Correction model finished. Show result.". Further, the graphical representation generated and presented in step S507 includes one or more hemodynamic parameters that have been calculated using the fluid dynamics model.

In case the classifying unit, in step S302, determines that the orientation of the segmentation is unknown, in step S505 a graphical representation of a warning message indicating that the orientation is unknown is generated. The warning message may for example read "Ambiguous orientation. Please identify the proximal end of the segmentation." Further, step S505 may include outputting an auditory or haptic signal indicating that the orientation is unclear through output unit 501. The haptic or auditory signal shall differ from the haptic or auditory signal used in case of a warning message in case of an error indication.

In some embodiments, the warning message may be displayed on the display unit 500 alongside the diagnostic image 10. In this case, the user may manually input a proximal (and/or distal) end for the segmentation. In other embodiments, the warning message may be displayed alongside the (preliminary and possibly inaccurate) physiological model and the respective hemodynamic parameters and the user may decide whether or not he or she will rely on said determined parameters or whether he or she prefers to repeat the segmentation and modeling procedure.

Although in the above-cited embodiments, the diagnostic images have been acquired using X-ray angiography, it shall be understood that other imaging modalities may likewise be used, such as computed tomography, ultra sound imaging, magnetic resonance imaging or the like. It shall also be understood that, although the above-cited embodiments foresee the use of a single image, multiple images may also be used to generate the model.

Further, while in the above embodiments, the vessel diameter slope and the difference in x- and y-direction have been used as vessel parameters to classify the segmentation, it shall be understood that further features such as the C-arm projection angles, a virtual FFR calculation in both directions (i.e. from proximal to distal and from distal to proximal), a sequence of projections of the intervention and/or an automatically tracked contrast catheter position may be used as input for the assessment of the vessel of interest.

Further, while in the above-cited embodiments, support vector machine is used as a classifier, it shall be understood that other classifiers may also be used. Likewise, the classifying unit may implement a neural network for classification of the orientation.

While in the above-cited embodiments, the fractional flow reserve and/or the instantaneous wave-free ratio have been indicated as hemodynamic indices, it shall be understood that further indices may also be derived such as the pressure ratio between the pressure distal to a stenosis and a pressure in the aorta, the coronary flow reserve as well as further, flow-, pressure- or likewise related indices.

Further, while in the above-cited embodiments, the apparatus itself determines the segmentation data of the diagnostic image data, it shall be understood that the term determining is to be interpreted broadly and may also encompass the importing of the segmentation data from another apparatus.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the segmenting of the at least one diagnostic image, the deriving of the at least one vessel parameter, the classifying of the at least one vessel parameter, the generating of the physiological model, the correcting of the physiological model and/or the segmentation data et cetera performed by one or several units or devices can be performed by any other number of units or devices. These procedures in accordance with the invention can hereby be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

A 502 The invention relates to an apparatus for assessing a vessel of interest of a patient, comprising: an input unit configured to receive segmentation data indicative of a vessel segmentation of the vessel of interest, a computation unit configured to derive at least one vessel parameter based on said segmentation data, and a classifying unit configured to receive the at least one vessel parameter and to classify said at least one vessel parameter to obtain an indication of a segmentation orientation of said vessel segmentation. Further, the invention relates to a method performed by said apparatus.

The invention claimed is:

1. An apparatus for assessing a vessel of interest of a patient, the apparatus comprising:
a processor in communication with memory, the processor configured to:
receive segmentation data to perform a vessel segmentation of the vessel of interest in at least one diagnostic image, the segmentation data defining a segmentation starting position and a segmentation ending position to segment the vessel of interest,
derive at least one vessel parameter for the vessel segmentation based on the segmentation data, and
classify the at least one vessel parameter to obtain an indication of a vessel segmentation orientation of the vessel segmentation, the vessel segmentation orientation indicating a blood flow direction between the segmentation starting position and the segmentation ending position,
wherein the classification is based on a classifier derived from a dataset correlating a set of known vessel segmentation orientations with a set of corresponding values of the at least one vessel parameter.

2. The apparatus according to claim 1, wherein the processor is further configured to:
receive a user input indicating the segmentation starting position and the segmentation ending position for the vessel of interest represented in the at least one diagnostic image, and
segment the vessel of interest represented in the at least one diagnostic image to obtain the vessel segmentation, wherein the vessel segmentation comprises a plurality of segments, each obtained for a particular position of a plurality of positions along a length of the vessel of interest, a first position of the plurality of positions corresponds to the segmentation starting position and a last position of the plurality of positions corresponds to the segmentation ending position.

3. The apparatus according to claim 2, wherein the at least one diagnostic image is acquired using X-ray angiography.

4. The apparatus according to claim 2, wherein the at least one vessel parameter is based on one or more of:
a geometric parameter value for each segment of the plurality of segments,
a first value related to the first position and a second position of the plurality of positions, respectively,
a second value related to the first position and the second position, respectively,
an acquisition parameter value related to acquisition settings used for acquiring the at least one diagnostic image, or
a dynamics parameter derived from the at least one diagnostic image.

5. The apparatus according to claim 1, wherein the classifier comprises a plurality of classifiers each trained using a different training dataset correlating the vessel segmentation orientation with a corresponding subset of the at least one vessel parameter.

6. The apparatus according to claim 1, wherein the classifier comprises a support vector machine.

7. The apparatus according to claim 1, further comprising a display, wherein the processor is further configured to generate a graphical representation in response to the indication of the vessel segmentation orientation and the display is configured to display the graphical representation to a user.

8. The apparatus according to claim 1, wherein the indication of the vessel segmentation orientation obtained by the classifier comprises:
an error indication indicating that the vessel segmentation orientation is inverted, if the blood flow direction is from the segmentation ending position to the segmentation starting position, a verification indication indicating that the vessel segmentation orientation is normal, if the blood flow direction is from the segmentation starting position to the segmentation ending position, or a clearness indication indicating that the vessel segmentation orientation is unclear, if the blood flow direction between the segmentation starting position and the segmentation ending position is unclear.

9. The apparatus according to claim 8, the processor is further configured to perform a correction segmentation having to a normal segmentation orientation, in response to the indication of the vessel segmentation orientation of the vessel segmentation comprising the error indication.

10. The apparatus according to claim 9, wherein the processor is further configured to output the indication of the vessel segmentation orientation of the vessel segmentation.

11. A method for assessing a vessel of interest of a patient, the method comprising:
receiving segmentation data to perform a vessel segmentation of the vessel of interest in at least one diagnostic image, the segmentation data defining a segmentation starting position and a segmentation ending position to segment the vessel of interest,
deriving at least one vessel parameter for the vessel segmentation based on the segmentation data, and
classifying the at least one vessel parameter to obtain an indication of a vessel segmentation orientation of the vessel segmentation, the vessel segmentation orientation indicating a blood flow direction between the segmentation starting position and the segmentation ending position,
wherein the classifying is based on a classifier derived from a dataset correlating a set of known vessel segmentation orientations with a set of corresponding values of the at least one vessel parameter.

12. The method according to claim 11, further comprising outputting the indication of the vessel segmentation orientation of the vessel segmentation.

13. A non-transitory computer-readable storage medium having stored a computer program comprising instructions which, when executed by a processor, cause the processor to:
receive segmentation data to perform a vessel segmentation of a vessel of interest, the segmentation data defining a segmentation starting position and a segmentation ending position to segment the vessel of interest,
derive at least one vessel parameter for the vessel segmentation based on the segmentation data, and
classify the at least one vessel parameter to obtain an indication of a vessel segmentation orientation of the vessel segment, the vessel segmentation orientation indicating a blood flow direction between the segmentation starting position and the segmentation ending position,
wherein the classification is based on a classifier derived from a dataset correlating a set of known vessel segmentation orientations with a set of corresponding values of the at least one vessel parameter.

14. The non-transitory computer-readable storage medium according to claim 13, wherein the instructions, when executed by the processor, further cause the processor to:
receive a user input indicating the segmentation starting position and the segmentation ending position for the vessel of interest represented in at least one diagnostic image; and segment the vessel of interest represented in the at least one diagnostic image to obtain the vessel segmentation, wherein the vessel segmentation comprises a plurality of segments, each obtained for a particular position of a plurality of positions along a length of the vessel of interest, a first position of the plurality of positions corresponds to the segmentation starting position and a last position of the plurality of positions corresponds to the segmentation ending position.

15. The non-transitory computer-readable storage medium according to claim 14, wherein the at least one vessel parameter is based on one or more of:
a geometric parameter value for each segment of the plurality of segments,
a first value related to the first position and a second position of the plurality of positions, respectively,
a second value related to the first position and the second position, respectively,
an acquisition parameter value related to acquisition settings used for acquiring the at least one diagnostic image, or
a dynamics parameter derived from the at least one diagnostic image.

16. The non-transitory computer-readable storage medium according to claim 13, wherein the indication of the vessel segmentation orientation obtained by the classifier comprises:
an error indication indicating that the vessel segmentation orientation is inverted, if the blood flow direction is from the segmentation ending position to the segmentation starting position,
a verification indication indicating that the vessel segmentation orientation is normal, if the blood flow direction is from the segmentation starting position to the segmentation ending position, or
a clearness indication indicating that the vessel segmentation orientation is unclear, if the blood flow direction between the segmentation starting position and the segmentation ending position is unclear.

17. The non-transitory computer-readable storage medium according to claim 16, wherein the instructions, when executed by the processor, further cause the processor to: perform a correction segmentation having to a normal segmentation orientation, in response to the indication of the vessel segmentation orientation of the vessel segmentation comprising the error indication.

18. The method according to claim 11, further comprising:
receiving a user input indicating the segmentation starting position and the segmentation ending position for the vessel of interest represented in the at least one diagnostic image; and
segmenting the vessel of interest represented in the at least one diagnostic image to obtain the vessel segmentation, wherein the vessel segmentation comprises a plurality of segments, each obtained for a particular position of a plurality of positions along a length of the vessel of interest, a first position of the plurality of positions corresponds to the segmentation starting position and a last position of the plurality of positions corresponds to the segmentation ending position.

19. The method according to claim 18, wherein the at least one vessel parameter is based on one or more of:
a geometric parameter value for each segment of the plurality of segments,
a first value related to the first position and a second position of the plurality of positions, respectively, a second value related to the first position and the second position, respectively, an acquisition parameter value related to acquisition settings used for acquiring the at least one diagnostic image, or a dynamics parameter derived from the at least one diagnostic image.

20. The method according to claim 11, wherein the indication of the vessel segmentation orientation obtained by the classifier comprises:

an error indication indicating that the vessel segmentation orientation is inverted, if the blood flow direction is from the segmentation ending position to the segmentation starting position, a verification indication indicating that the vessel segmentation orientation is normal, if the blood flow direction is from the segmentation starting position to the segmentation ending position, or a clearness indication indicating that the vessel segmentation orientation is unclear, if the blood flow direction between the segmentation starting position and the segmentation ending position is unclear.

* * * * *